G. E. LEHTINEN.
AERONAUTICAL COMPASS.
APPLICATION FILED NOV. 20, 1916.

1,270,178.

Patented June 18, 1918.

INVENTOR
George E. Lehtinen.

WITNESSES
Arthur K. Moore
Wm Zeaman

BY Richard B. Owen,
ATTORNEY

UNITED STATES PATENT OFFICE.

GEORGE E. LEHTINEN, OF EAST JAFFREY, NEW HAMPSHIRE.

AERONAUTICAL COMPASS.

1,270,178.

Specification of Letters Patent.    Patented June 18, 1918.

Application filed November 20, 1916.   Serial No. 132,416.

*To all whom it may concern:*

Be it known that I, GEORGE E. LEHTINEN, a citizen of the United States, residing at East Jaffrey, in the town of Jaffrey, in the county of Cheshire and State of New Hampshire, have invented certain new and useful Improvements in Aeronautical Compasses, of which the following is a specification.

This invention has relation to devices for aeroplanes and airships to indicate the direction of travel thereof, and the degree of inclination, either upward or downward of the machine.

Another object of the invention is to provide an indicator having the above named characteristics, and wherein a single pointer may be utilized conjunctively to indicate the direction of travel of the machine, and the degree of inclination thereof.

In addition to the foregoing my invention comprehends improvements in the details of construction and arrangement of parts to be hereinafter more fully described, and particularly pointed out in the appended claim.

In the accompanying drawings in which similar and corresponding parts are designated by the same characters of reference throughout the several views in which they appear:

Figure 1:
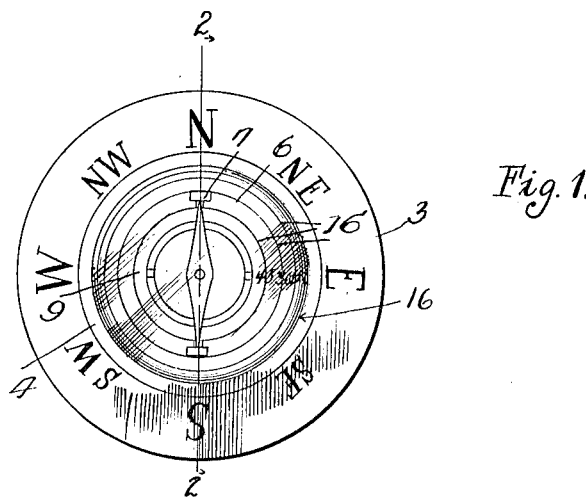
Figure 1, is a view in plan of an indicating device constructed after the manner of my invention.
Figure 2:
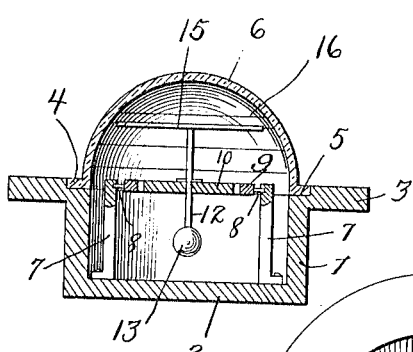
Fig. 2, is a vertical transverse section taken on the line 2—2 of the preceding figure.
Figure 3:
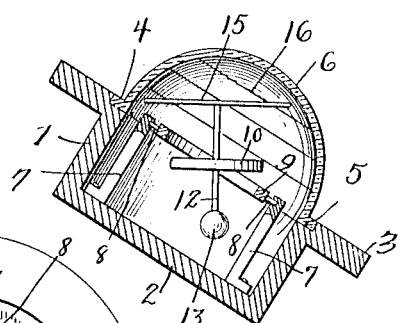
Fig. 3, is a view similar to Fig. 2, illustrating the relation of the parts, when the machine upon which the device is used is inclined.
Figure 4:
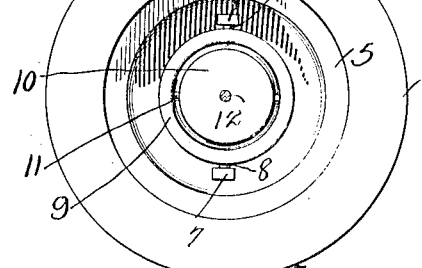
Fig. 4, is a horizontal section taken on the line 4—4 of Fig. 2.

With reference to the drawings 1 indicates a cylindrical casing having a closed bottom portion 2, and an integrally formed horizontally and radially extending annular flange 3. The casing is formed adjacent the upper and inner edge thereof with an annular rabbeted portion 4 to receive the flange 5 of an inverted hemispherical, hollow member 6 which is formed of glass or other transparent material.

A gimbal joint is erected within the casing, and comprises diametrically opposed vertical standards 7 supporting at their upper ends the trunnions 8 of a ring 9 forming one member of the gimbal joint. The inner member of the gimbal joint is in the nature of a disk 10 having trunnions 11 which are journaled in the sides of the ring 9, the axes of the several trunnions 8 and 11 being disposed at relative right angles after the usual fashion so as to permit oscillation of the ring upon the standards and the disk upon the ring. A pivot 12 is extended centrally of the disk 10, and is provided at its lower end with a weight 13, and is adapted to support at its upper end a magnetic needle 15.

Thus, when the casing of the device is supported upon a relatively stationary part of an aeroplane or airship, and in descending the machine is inclined, the weight 13 will tend to retain the pivot 12 in a vertical position, thereby moving the disk and ring relatively to each other, and whereby through the provision of the disk and ring, the vertical position of the pivot may be maintained at all times. The inner surface of the hemispherical member 6 is disposed concentrically with the central point of oscillation of the disk and ring, whereby the terminals of the magnetic needle will be at all times disposed closely and at the same distance from the inner surface, of the cover. Therefore, to indicate the degree of inclination, graduations 16 may be inscribed upon the inner or outer surface of the hemispherical cover, said graduations to be in the form of circles of different diameters having their centers located on a center line extending from the axial center of the casing, to a point centrally of the outer surface thereof. By numbering each graduated ring, it will be obvious that as the machine is inclined, and either one or the other terminal of the magnetic needle is brought against one of the graduated rings, the degree of inclination of the machine may be thus indicated.

To indicate the direction of travel the face of the flange 3 of the casing which may be termed the compass dial is provided with the cardinal and intermediate points of the compass upon its surface to be read in connection with the direction in which the magnetic needle is pointed. Thus, the direction of travel of the machine and the degree of inclination thereof may be determined at the same time, and at a glance, as the one pointer is utilizable as an indicator for both the graduations indicating degrees of inclination and the points of the compass.

While I have illustrated and described my invention with some degree of particularity, I realize that in practice various alterations thereof may be made and I therefore reserve the right and privilege of changing the form of the details of construction or otherwise altering the arrangement of the correlated parts without departing from the spirit of the invention, or the scope of the appended claim.

Having thus described my invention what I claim as new and desire to secure by Letters Patent is:—

An indicator for indicating the direction of travel and degree of inclination of aeroplanes, including a circular casing open at the top, a peripheral flange formed at the open top of the casing, said casing having an annular groove at its upper end, a hemispherical transparent shell having a peripheral flange which is seated in the groove of the casing, a pair of spaced standards mounted within the casing, a ring having oppositely extending trunnions journaled in the standards, a disk mounted within the ring and having oppositely extending trunnions journaled therein, the trunnions of the disk and ring being at relative right angles, a pin mounted centrally in the disk, a weight depending from the lower end of the pin, and a magnetized needle pivotally mounted upon the upper end thereof.

In testimony whereof I affix my signature in presence of two witnesses.

GEORGE E. LEHTINEN.

Witnesses:
HUGH A. FORSEN,
JOHN TÜLLO.